US008670142B2

(12) United States Patent
Dobinson et al.

(10) Patent No.: US 8,670,142 B2
(45) Date of Patent: Mar. 11, 2014

(54) MULTI-RECIPIENT FACSIMILE COMMUNICATIONS

(75) Inventors: Alexandria Dobinson, Herts (GB); Gareth Dobinson, Herts (GB); Nicholas Baxter, Northfordshire (GB); Lewis Williams, Barry (GB)

(73) Assignee: Xerox Corporation, Norwalk, CT (US)

( * ) Notice: Subject to any disclaimer, the term of this patent is extended or adjusted under 35 U.S.C. 154(b) by 360 days.

(21) Appl. No.: 13/153,668

(22) Filed: Jun. 6, 2011

(65) Prior Publication Data

US 2012/0307315 A1    Dec. 6, 2012

(51) Int. Cl.
*G06F 3/12*    (2006.01)

(52) U.S. Cl.
USPC ..................................................... 358/1.15

(58) Field of Classification Search
USPC ............... 358/1.15, 400, 468, 402, 403, 450; 707/999.002; 715/234
See application file for complete search history.

(56) References Cited

U.S. PATENT DOCUMENTS

| 5,001,572 | A | 3/1991 | Hashimoto et al. |
| 7,313,340 | B2 * | 12/2007 | Savitzky et al. ................ 399/84 |
| 2004/0136513 | A1 | 7/2004 | Chiu |
| 2006/0238820 | A1 | 10/2006 | Hubert et al. |
| 2007/0201101 | A1 * | 8/2007 | Corona et al. ................ 358/400 |

* cited by examiner

*Primary Examiner* — Charlotte M Baker
(74) *Attorney, Agent, or Firm* — Novel IP

(57) ABSTRACT

The present specification discloses a fax machine with routines for generating more than one cover sheet for a single fax job, where the cover sheets are different. The cover sheets are generated by providing a display which includes a first recipient input area for identifying a first recipient and a second recipient input area for identifying a second recipient and a first comment input area for inputting a first comment associated with the first recipient and a second comment input area for inputting a second comment associated with the second recipient.

20 Claims, 10 Drawing Sheets

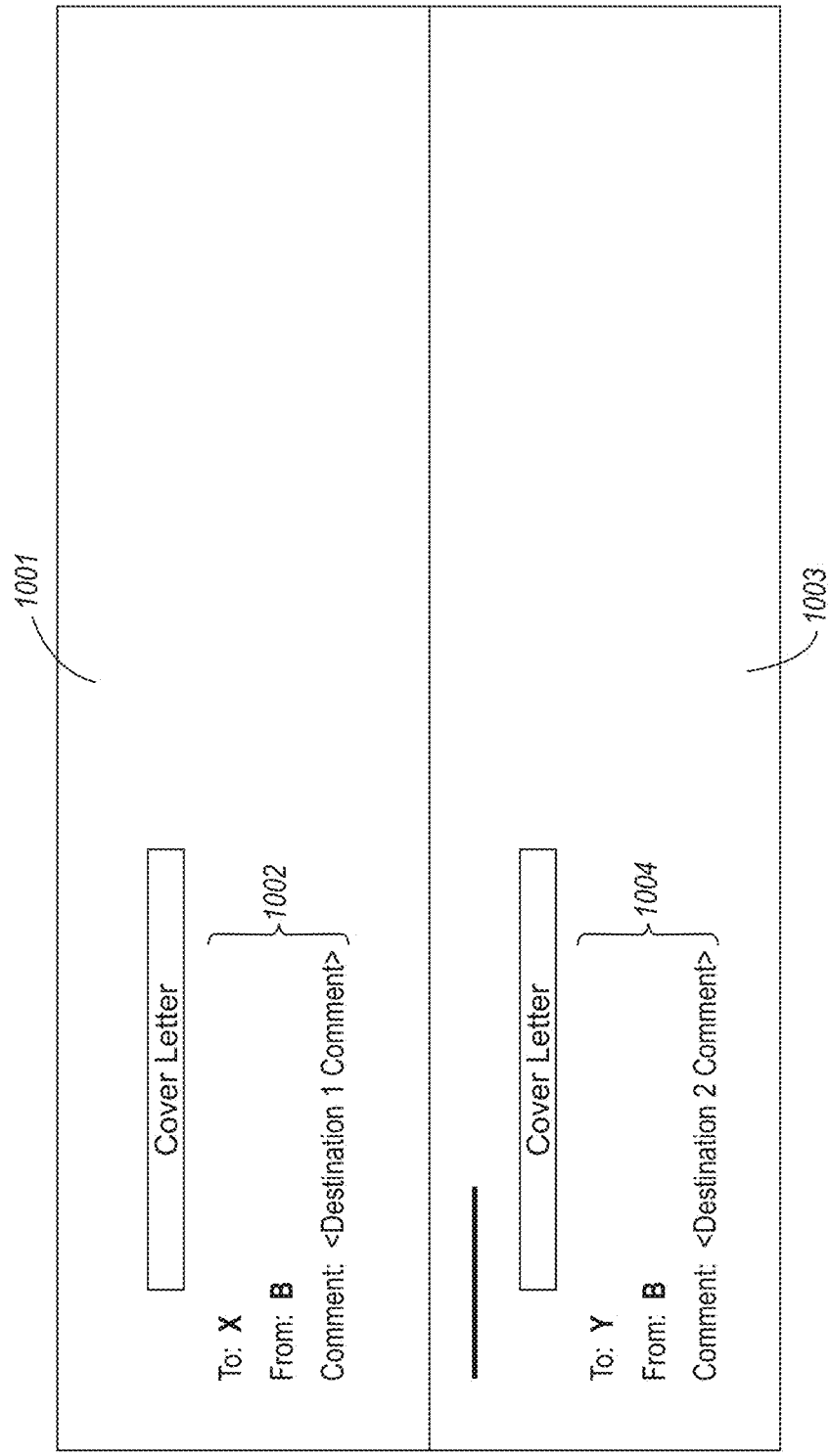

MULTI-RECIPIENT FACSIMILE COMMUNICATIONS

FIELD

The presently disclosed embodiments relate generally to methods and systems for data communications and, more particularly, to methods and systems for enabling facsimile users to customize various fields in a facsimile cover sheet, thereby permitting multiple recipients at different communication addresses to receive customized cover sheets.

BACKGROUND

Facsimile (fax) devices play an important role for everyday communication between businesses. Facsimile communications provide a swift and convenient medium for sending simple messages or transferring copies of documents. Nevertheless, facsimile communications do have their limitations.

For example, users have the option to send a cover letter when faxing a document to a destination. A destination means a communication address, such as a telephone number, to which a facsimile communication is directed. Currently, if a single fax is transmitted to more than one destination, and sending a cover letter is selected, the cover letter is generic for all the destinations. That is, the same cover letter is sent to all the recipients. Further, the cover sheet interface of current facsimile devices also provides users the option of entering comments. However, the comments, once entered, remain the same, regardless of the number of recipients, and are not customized for each recipient. This results in placing the same comment on all the cover letters corresponding to one job. This may, at times, result in an undesirable situation, such as accidentally sending the wrong comment to the wrong person.

Further, there are times when a fax is sent on the behalf of several people. Current user interfaces of facsimile devices also do not allow customizing the 'From' field in a way that names and designations, or any other relevant information, such as email or contact information, of individual senders may be reflected.

There is therefore a need for methods and systems that allow facsimile users to customize the various fields on the cover sheet, including comments, 'To' and 'From' fields, in accordance with the target recipients. It would also be desirable that the ability to customize the facsimile cover sheet transmitted from the common facsimile device is provided without requiring the users to employ software other than the software normally employed with the common facsimile device.

SUMMARY

The aforementioned and other embodiments of the present system shall be described in greater depth in the drawings and detailed description provided below.

In one embodiment, the present specification discloses a computer readable medium storing a plurality of programmatic instructions adapted to be executed by a fax machine, wherein said plurality of programmatic instructions comprise: a) routines for generating an interface comprising a first option, wherein actuation of said first option determines that the fax machine should generate at least a first cover sheet and a second cover sheet with a fax job, wherein said first cover sheet is different from said second cover sheet; b) routines, responsive to an actuation of said first option, for generating an interface comprising at least a first recipient input area for identifying a first recipient and a second recipient input area for identifying a second recipient; c) routines, responsive to an actuation of said first option, for generating an interface comprising at least a first comment input area for inputting a first comment associated with the first recipient and a second comment input area for inputting a second comment associated with the second recipient; d) routines for generating the first cover sheet comprising the first recipient and the first comment and for generating the second cover sheet comprising the second recipient and the second comment; e) routines for formatting said first cover sheet and fax job for facsimile transmission and formatting said second cover sheet and fax job for facsimile transmission; and f) routines for transmitting the first cover sheet and fax job to the first recipient via facsimile transmission and for transmitting the second cover sheet and fax job to the second recipient via facsimile transmission.

Optionally, the first option is one of a first set of options which may be alternatively, and not simultaneously, actuated. The first set of options comprises a second option, wherein actuation of said second option determines that the fax machine should generate, and transmit, a maximum of one cover sheet with the fax job. The first set of options comprises a third option, wherein actuation of said third option determines that the fax machine should not generate any cover sheet with the fax job. The computer readable medium further comprises routines for generating a default comment which is automatically inputted into the first comment input area and the second comment input area upon actuating a predefined option. The computer readable medium further comprises routines for displaying the first cover sheet and second cover sheet prior to transmitting the first cover sheet and fax job to the first recipient and transmitting the second cover sheet and fax job to the second recipient. The computer readable medium further comprises routines for importing the identity of the first recipient, identity of the second recipient, first comment, and second comment from a separately executable application and for automatically populating the first recipient input area, the second recipient input area, the first comment input area, and the second comment input with said identity of the first recipient, identity of the second recipient, first comment, and second comment. The computer readable medium further comprises routines for generating an auditory or visual warning that the first recipient and the second recipient are associated with the same comment.

The computer readable medium further comprises routines, responsive to an actuation of said first option, for generating an interface comprising at least a first graphical icon input area for inputting a graphical icon associated with the first recipient and a second graphical icon input area for inputting a second graphical icon associated with the second recipient. The computer readable medium further comprises routines, responsive to an actuation of said first option, for generating an interface comprising at least a first code input area for inputting a code associated with a first sender and a second code input area for inputting a second code associated with a second sender.

In another embodiment, the present specification discloses a method of generating and transmitting a plurality of customized cover sheets for a single fax job, comprising: a) generating an interface comprising a first option, wherein actuation of said first option determines that the fax machine should generate at least a first cover sheet and a second cover sheet with a fax job, wherein said first cover sheet is different from said second cover sheet; b) responsive to an actuation of said first option, generating an interface comprising at least a first recipient input area for identifying a first recipient and a second recipient input area for identifying a second recipient; c) responsive to an actuation of said first option, generating an interface comprising at least a first comment input area for inputting a first comment associated with the first recipient and a second comment input area for inputting a second comment associated with the second recipient; d) generating the first cover sheet comprising the first recipient and the first comment; e) generating the second cover sheet comprising the second recipient and the second comment; f) formatting said first cover sheet for facsimile transmission; g) formatting said second cover sheet for facsimile transmission; h) transmitting the first cover sheet and fax job to the first recipient via facsimile transmission; and i) transmitting the second cover sheet and fax job to the second recipient via facsimile transmission.

Optionally, the first option is one of a first set of options which may be alternatively, and not simultaneously, actuated. The first set of options comprises a second option, wherein actuation of said second option determines that the fax machine should generate, and transmit, a maximum of one cover sheet with the fax job. The first set of options comprises a third option, wherein actuation of said third option determines that the fax machine should not generate any cover sheet with the fax job. The method further comprises generating a default comment which is automatically inputted into the first comment input area and the second comment input area upon actuating a predefined option. The method further comprises displaying the first cover sheet and second cover sheet prior to transmitting the first cover sheet and fax job to the first recipient and transmitting the second cover sheet and fax job to the second recipient. The method further comprises importing the identity of the first recipient, identity of the second recipient, first comment, and second comment from a separately executable application and for automatically populating the first recipient input area, the second recipient input area, the first comment input area, and the second comment input with said identity of the first recipient, identity of the second recipient, first comment, and second comment.

The method further comprises generating an auditory or visual warning that the first recipient and the second recipient are associated with the same comment. The method further comprises generating an interface comprising at least a first graphical icon input area for inputting a graphical icon associated with the first recipient and a second graphical icon input area for inputting a second graphical icon associated with the second recipient responsive to an actuation of said first option. The method further comprises routines generating an interface comprising at least a first code input area for inputting a code associated with a first sender and a second code input area for inputting a second code associated with a second sender responsive to an actuation of said first option.

BRIEF DESCRIPTION OF THE DRAWINGS

These and other features and advantages will be appreciated as they become better understood by reference to the following Detailed Description when considered in connection with the accompanying drawings, wherein:

FIG. 10 depicts an exemplary cover sheet output.

Figure 1:
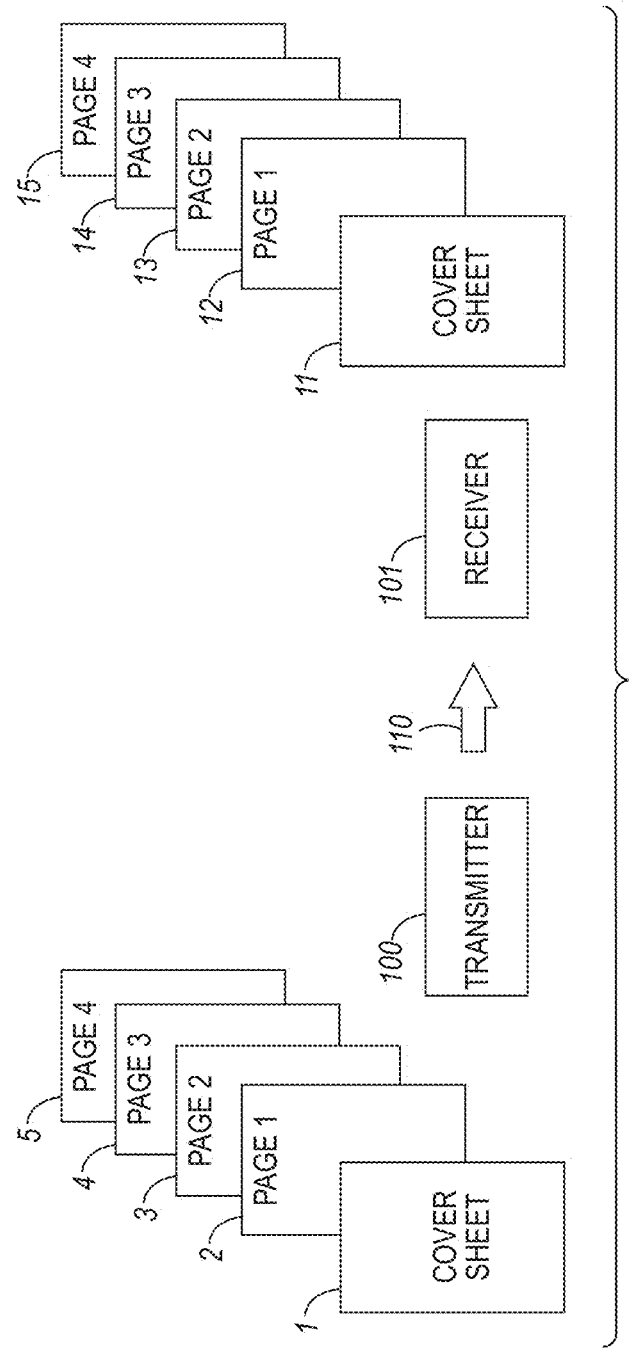
FIG. 1 is a schematic view of a facsimile system for transmission of documents along with a cover sheet.

In the figures, the first digit of any three-digit number generally indicates the number of the figure in which the element first appears.

DETAILED DESCRIPTION

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the embodiments in the present specification are to be accorded the widest scope encompassing numerous alternatives, modifications and equivalents consistent with the principles and features disclosed. For purpose of clarity, details relating to technical material that is known in the technical fields related to the embodiments in the specification have not been described in detail so as not to unnecessarily obscure the present invention.

In one embodiment, the present specification discloses methods for allowing users to generate customized cover letters for multiple recipients in a facsimile transmission. In one embodiment, the system presents a user interface that allows users to select multiple "To" and "Comment" fields, corresponding to a plurality of destinations. The relevant "To" and Comment" fields can then be tailored for each destination and displayed on corresponding cover letters. This makes making the cover letter unique for each destination.

It may be noted that the word "system" or "fax machine" as used herein encompasses any apparatus or multi-function device which performs facsimile transmission functions, including but not limited to a standalone fax machine, a machine that combines printing, scanning, and/or faxing functionality, any computer executing software for faxing documents through a communication network, or any handheld device executing software for faxing documents through a communication network. It should also be appreciated that a "single fax job" shall refer to the processing of, and subsequent facsimile transmission of, a single document, which may comprise one or more pages, to one or more recipients. Conventionally, one cover page has been associated with a single fax job. The present specification discloses methods and systems for enabling a plurality of cover pages, each customized for an intended recipient, to be processed and transmitted with a single fax job.

As used herein, "facsimile", "fax communication", or "fax function" shall include any transmission of data from a sender to one or a plurality of receivers, wherein the data includes "image data" associated with one or more two-dimensional images, plus a quantity of "cover sheet" data. The image data may be in a traditional fax format such as CCITT, or in any digital format such as pdf, or can be converted from one format to another in the course of being transmitted. The cover sheet data may or may not be in the form of image data, but could be in the form of, for example, text data such as ASCII. Further as used herein, neither the image data nor the cover sheet data need at any time be printed or scanned; the image data or cover data can originate in virtual form; and the received image data or cover data can be merely displayed, and can be respectively displayed in different places, such as in displays associated with hand-held devices. Further as used herein, the transmission medium for either image data or cover sheet data may or may not include a traditional fax medium such as telephone lines or wireless telephone channels, however defined. The transmission medium may include, at any portion thereof, digital communication such as electronic mail, posting to a website, or posting to a text-based service.

Referring to FIG. 1, a facsimile arrangement is shown. As illustrated in FIG. 1, a document is prepared to be transmitted by a transmitter 100 to a receiving station or receiver 101 through a communication channel 110. In the example illustrated in FIG. 1, the document includes a cover sheet 1 and pages 1-4 (sheets 2, 3, 4, and 5) which are to be transmitted by the transmitter 100 to the receiver 101.

To facilitate the transmission of the document to the receiver 101, the transmitter 100 includes a scanner which scans the sheets 1, 2, 3, 4, and 5 (cover sheet and pages 1-4) and converts the light reflected from the sheets during the scanning process into electrical signals which are digitized into image data representing, electronically, the images which have been scanned. This digital image data is then transmitted by the transmitter 100 along communication channel 110 to a receiver 101.

The communication channel may be any telecommunication channel, including wired channels transmitted through packetized networks, such as the Internet, or the Public Switched Telephone Network or wireless channels transmitted using cellular, Ethernet, or Bluetooth transmission protocols.

Upon receiving this digital image data, the receiver 101 converts the digital image data into electronic print data which is utilized by a digital printing device to print the image as scanned by the transmitter 100. Thus, corresponding cover sheet 11 and pages 12, 13, 14 and 15 are printed at receiver end.

Figure 2:
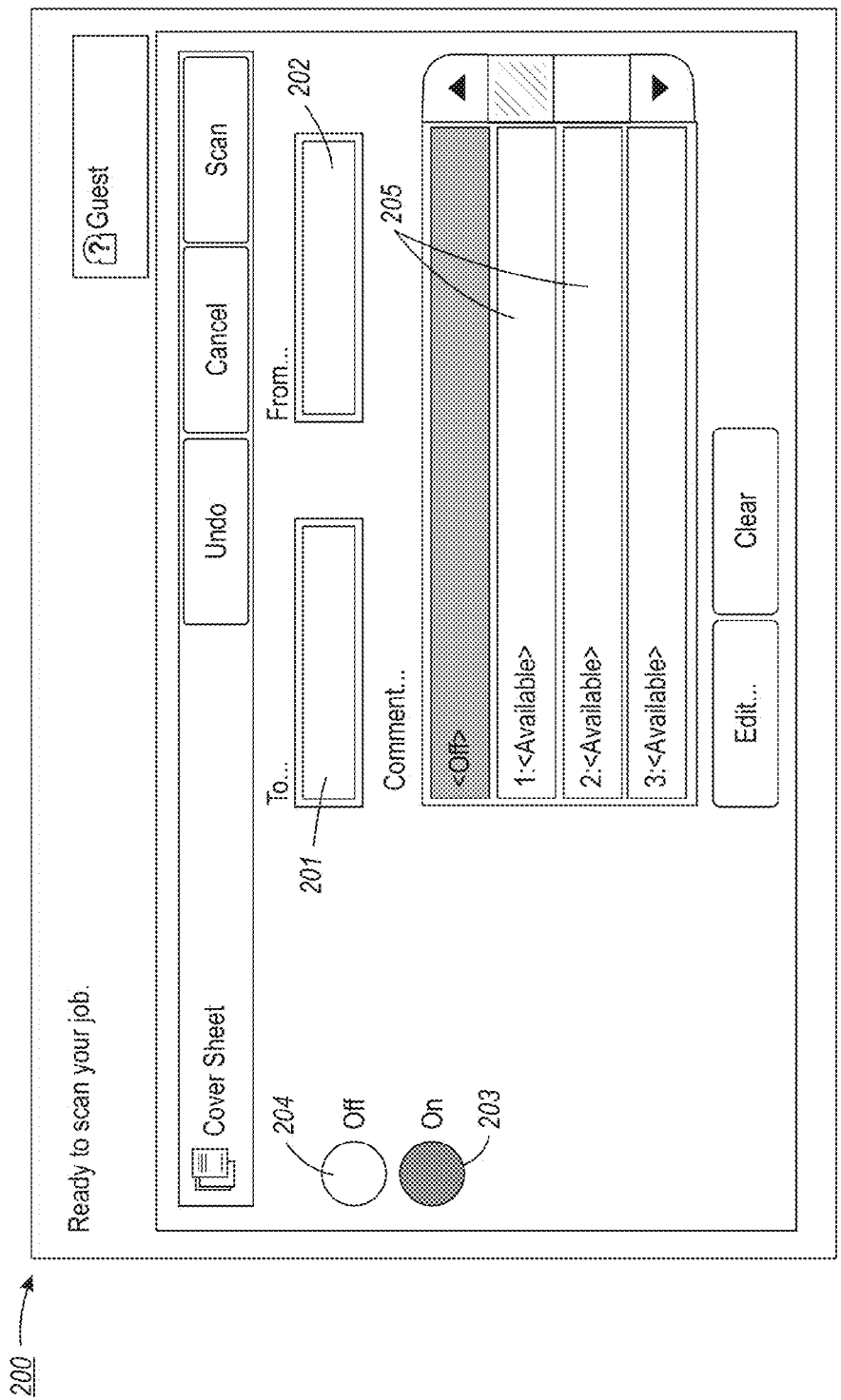
FIG. 2 depicts a facsimile user interface with single 'To', 'From' and 'Comment' fields.

Facsimile devices provide an interface for the user to enter relevant information for transmitting a document. FIG. 2 illustrates a conventional user interface 200. Referring to FIG. 2, a user can enter the names of recipients in the 'To' field 201, and the sender's name in the 'From' 202 field. The 'On' and 'Off' buttons 203, 204 allow a user to select the option of sending a cover page along with the document. The 'Comments' field 205 allows the user to enter comments or other information that will be included in the cover letter.

Figure 3:
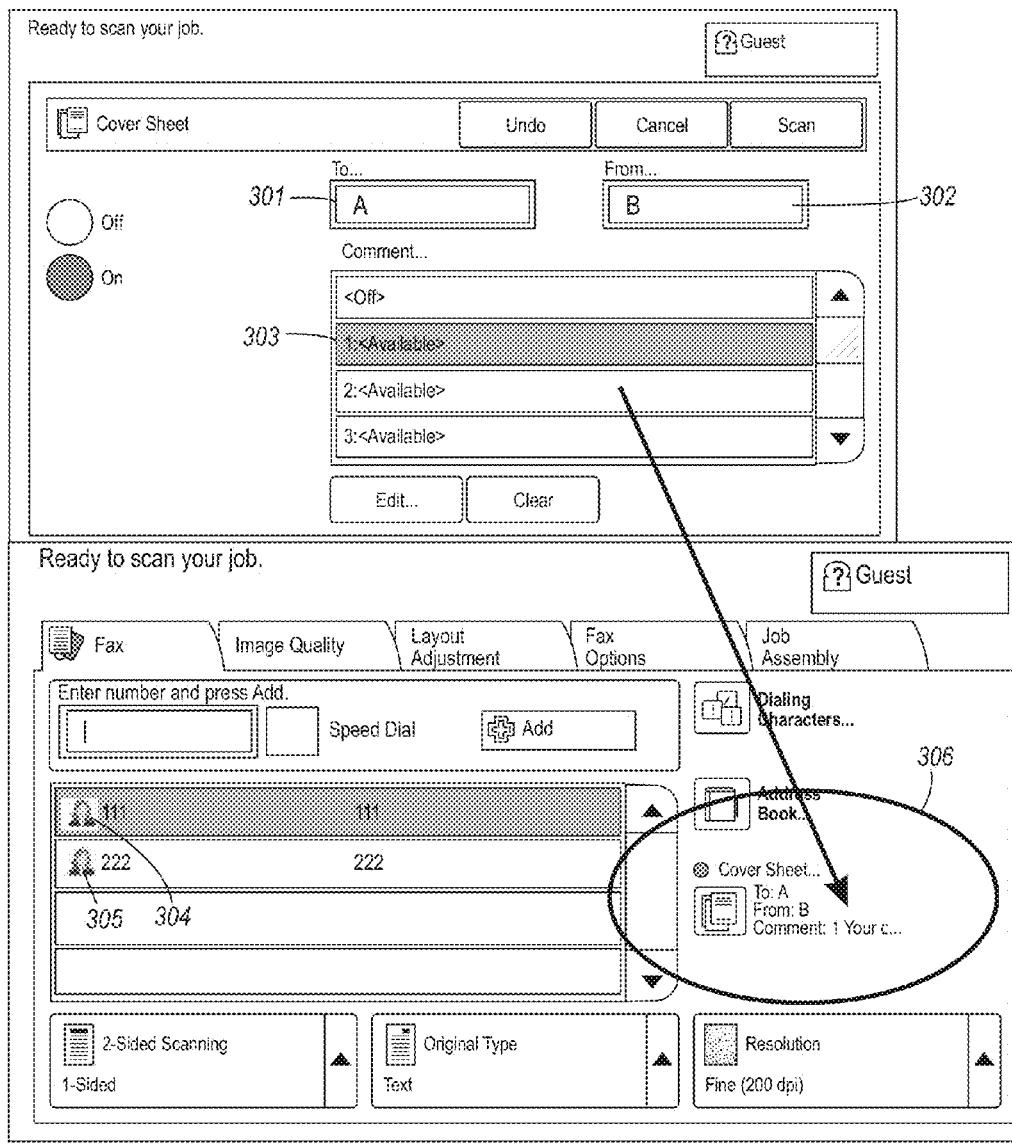
FIG. 3 illustrates how the 'To', 'From' and 'Comment' fields remain the same even when multiple recipients are selected.

A major drawback of this kind of user interface is that when a single fax document is sent to multiple recipients, which may mean sending the same document to multiple recipients, each of which is at a different fax number, or sending the same document to multiple recipients at the same fax number, the "To" and "From" remain the same. This is further illustrated in FIG. 3. Referring to FIG. 3, a user enters 'A' as recipient in the 'To' field 301, and 'B' as the sender in the 'From' field 302. The user also enters a comment in the comment field 1 303. This information would appear in the cover sheet. The user then enters two fax numbers 304 and 305. However the text entered in 'To' and 'From' fields remains the same for both recipients, as highlighted by the area 306. Further, the interface also retains the same comment on the cover sheet for both the first recipient 304 and second recipient 305. Thus cover letters for a single fax job are the same for all the destinations.

Figure 4:
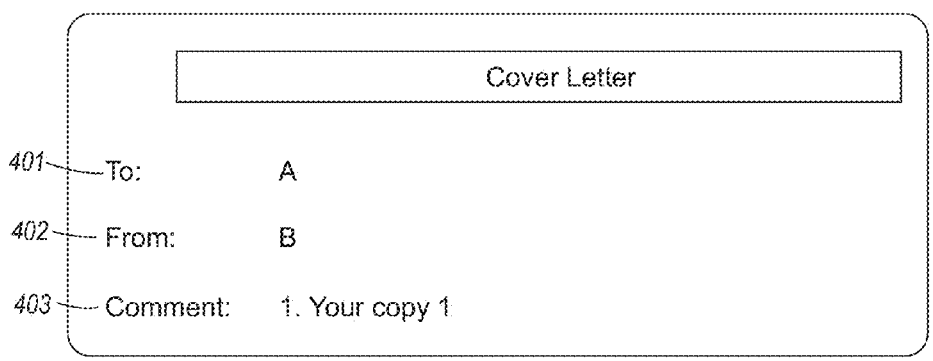
FIG. 4 is an exemplary generic cover letter that is generated regardless of the number of recipients.

FIG. 4 illustrates a generic cover letter that is produced as a result of the limited information that conventional user interfaces accept. The cover letter has the same 'To' 401, 'From' 402 and 'Comment' 403 fields for all the recipient fax numbers.

The present system enables the user to tailor cover letters to specific recipients, which avoids the possibility of confusion or embarrassment of sending wrong comments or having the wrong name on the cover letter. The present method can be implemented in the fax code running on the fax machine, so that the user interface is modified in a way that allows users to customize cover letters for recipients.

Figure 5:
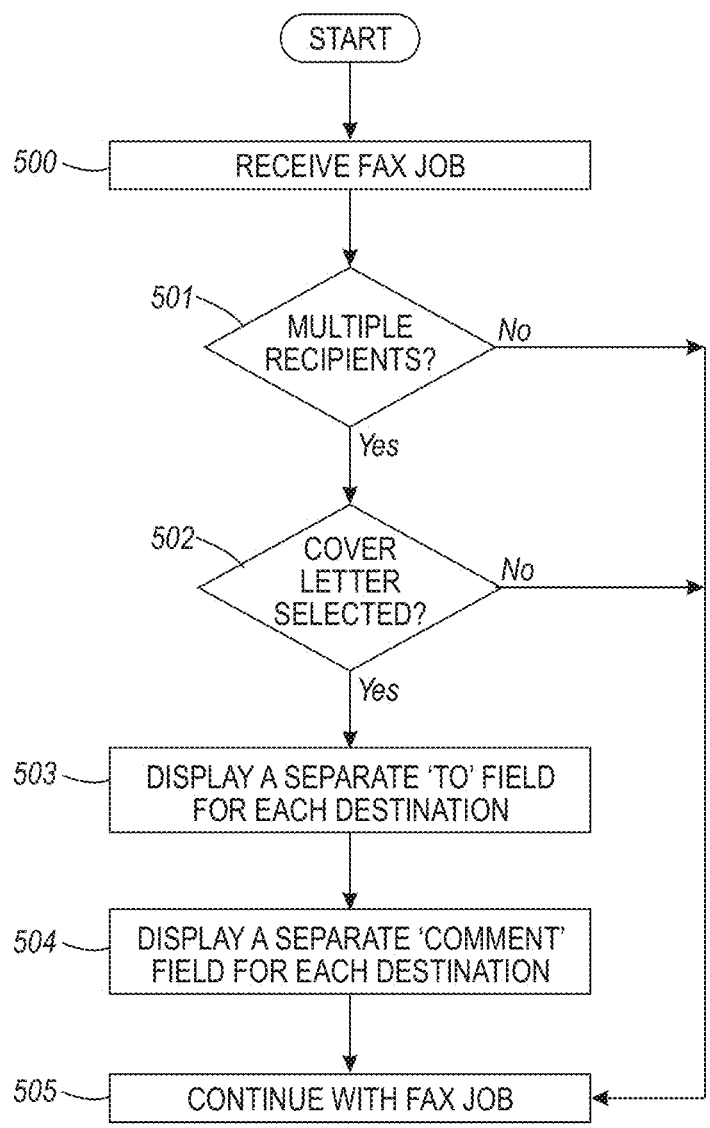
FIG. 5 is a flowchart depicting an exemplary method for enabling users to generate cover letters customized to specific recipients.
Figure 6:
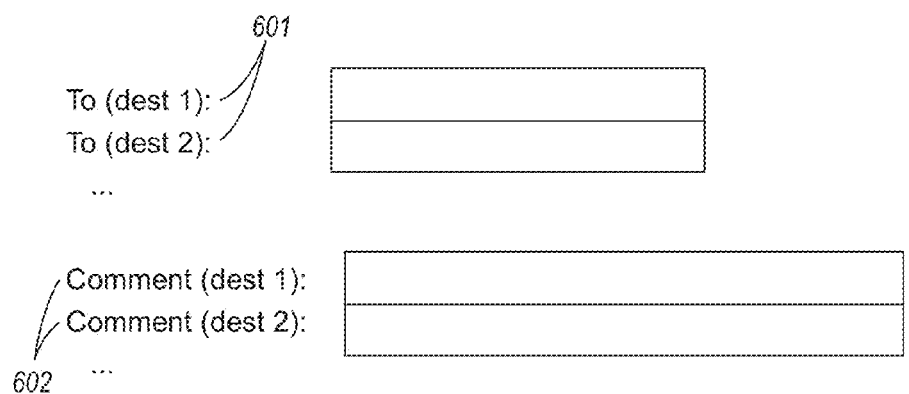
FIG. 6 depicts a first exemplary user interface screen for enabling the customization of a single cover letter for a fax transmission to multiple recipients and/or destinations.

FIG. 5 illustrates an exemplary method of customizing a plurality of cover letters to individual recipients for a single fax job. Referring to FIG. 5, after receiving a single fax job 500, the facsimile device recognizes that multiple recipients have been designated 501 by a user who has entered more than one fax number to which the document is to be sent. The device then checks 502 if the user has chosen to transmit a cover letter together with the documents which comprise the single fax job. If the program determines the user has opted to transmit a cover letter with the single fax job, the device presents 503 a user interface with multiple 'To' fields, so that the user can enter names of recipients corresponding to the plurality of recipients. Additionally, and optionally, if the program determines the user has opted to transmit a cover letter with the single fax job, the device presents 504 a user interface with multiple 'Comment' fields, corresponding to the number of recipients inputted by the user, so that the user can enter comments associated with each of the named recipients. FIG. 6 illustrates an exemplary user interface that allows names of multiple recipients to be entered in 'To' fields 601, and also provides the option of entering different comments for various recipients in the 'Comment' fields 602.

Figure 7:
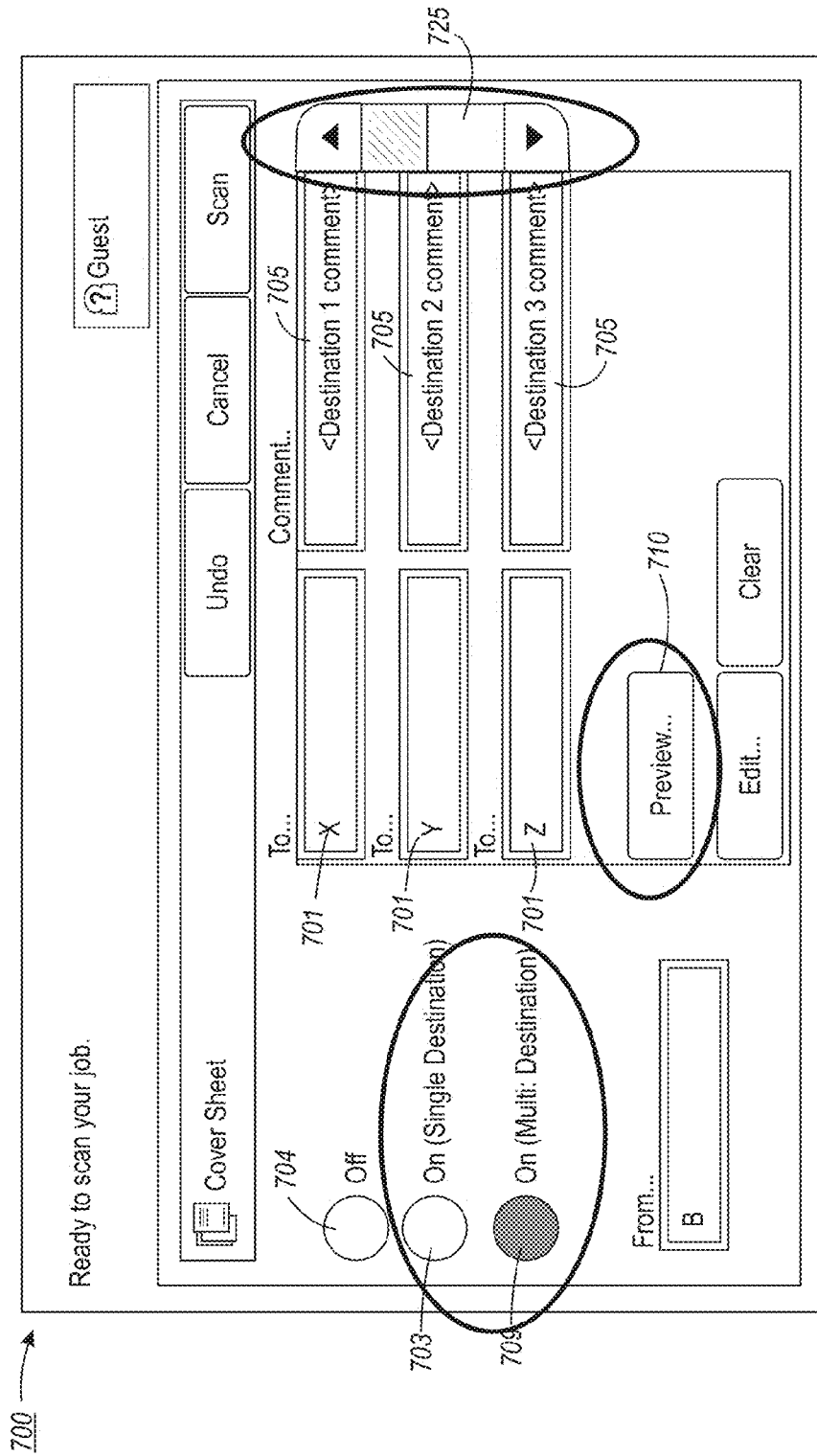
FIG. 7 depicts a second exemplary user interface screen for enabling the customization of a single cover letter for a fax transmission to multiple recipients and/or destinations.

Referring to FIG. 7, a user interface 700 is generated by a fax machine that, using a processor, executes a plurality of programmatic instructions, which may be stored in a memory local to or remote from the fax machine. The user interface 700 comprises a first set of options, that may be in the form of graphical icons 704, 703, 709, text boxes, check boxes, or any other form of visual representation, which may be alternatively, and not simultaneously, actuated. When one of the first set of options 704 is actuated by a user, thereby preventing the actuation of the remaining options in the first set of options 703, 709, the fax machine does not generate a cover sheet. When a second one of the first set of options 703 is actuated by a user, thereby preventing the actuation of the remaining options in the first set of options 704, 709, the fax machine generates a single cover sheet for the entire fax job, regardless of whether the fax job has one or more recipients. When a third one of the first set of options 709 is actuated by a user, thereby preventing the actuation of the remaining options in the first set of options 703, 704, the fax machine generates multiple cover sheets for a single fax job, where a first one of the multiple cover sheets may be customized for transmission to a first recipient of the single fax job and where a second one of the multiple cover sheets may be customized for transmission to a second recipient of the single fax job.

If an option 709 representing the generation of multiple cover sheets is actuated, the user interface 700 presents a plurality of inputs areas 701, such as dialog boxes, into which a user may input a name or identity of each recipient of the single fax job using, for example, a keyboard, mouse, electronic pen, touch screen, or other input device that is integrated into, or otherwise in data communication with, the fax machine. A scroll bar or function 725 permits a user to access additional input areas 701 to input additional recipient names.

Additionally, if an option 709 representing the generation of multiple cover sheets is actuated, the user interface 700 presents a plurality of inputs areas 705, such as dialog boxes, in relation to the recipient input areas 701. A user may input a comment, associated with each recipient of the single fax job, into one or more of the input areas 705, using, for example, a keyboard, mouse, electronic pen, touch screen, or other input device that is integrated into, or otherwise in data communication with, the fax machine. A scroll bar or function 725 permits a user to access additional input areas 705 to input additional comments associated with each recipient name.

In one embodiment, the user interface 700 provides an option 710 to generate a preview of each of the multiple cover sheets to ensure the proper recipient and comments are being generated. Referring to FIG. 10, the preview may comprise the display of a first cover letter 1001, which includes the relevant cover letter information 1002, such as the completed "To" field, the completed "From" field, and a comment customized to the first recipient in the "To" field. The preview may also comprise the display of a second cover letter 1003, which includes the relevant cover letter information 1004, such as the completed "To" field, the completed "From" field, and a comment customized to the second recipient in the "To" field.

Figure 8:
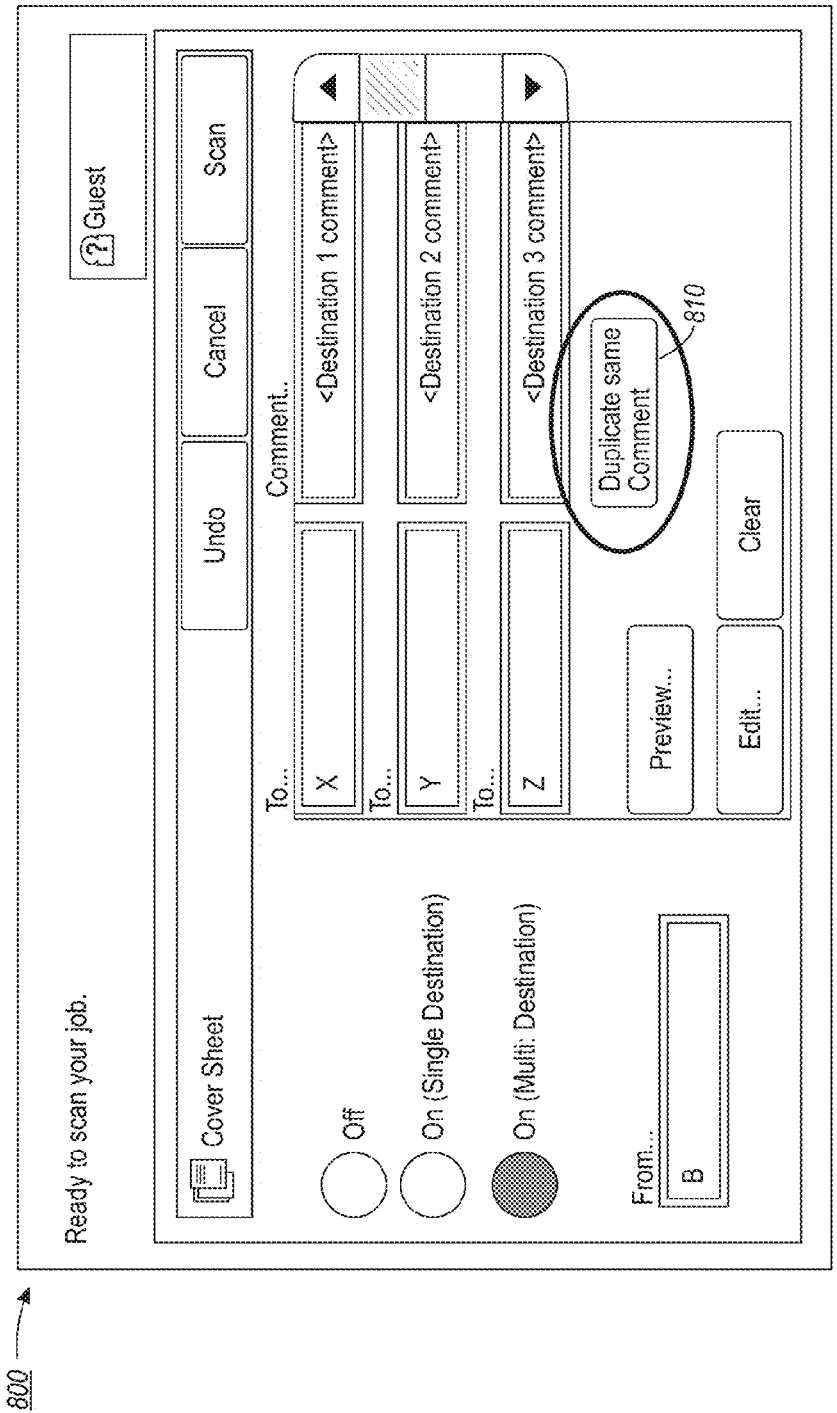
FIG. 8 depicts a third exemplary user interface screen for enabling the customization of a single cover letter for a fax transmission to multiple recipients and/or destinations.

Referring to FIG. 8, the user interface 800 may also provide an additional option 810 to duplicate the same comment across multiple cover sheets being transmitted in accordance with a single fax job. It should also be appreciated that other functions may be provided to enable a user to reliably and securely customize the generation of multiple cover sheets to multiple recipients of a single fax job, including options which, if actuated, a) allow a user to create a default comment which may be applied to a subset of all recipients, b) allow a user to associate a predefined comment with specific recipients, require a user to preview and actively approve each of the cover sheets being generated before transmission, c) permit a user to import a plurality of recipients and comments from third party programs, such as word processing, sales force management, spreadsheet, database, email or other data management programs, and populate the input areas 701, 705, and d) emits a customizable warning, such as a sound or visual icon, to alert a user when the same comments are being sent to different people.

Additionally, in one embodiment, the user interface may also enable a user to enter information corresponding to a plurality of senders in the 'From' field. This feature is particularly useful in situations where a single person sends fax on the behalf of several people, i.e. a single assistant broadcasting a fax on behalf of multiple salespeople during a sales promotion. In such cases, it may be desirable to customize the cover sheet to include information for each of the salespeople. Thus in one embodiment, the present system presents in the user interface input areas that allow the names of multiple senders to be entered in a plurality of 'From' fields and allows additional information, such as the senders' titles, contact information, email addresses, among other information, to be included in the cover sheets.

Additional input areas, tailored to either a particular recipient or a particular sender, may be provided in the user interface. Such additional input areas can allow a) a graphical image, i.e. logo, specific to a particular sender or recipient to be placed on each corresponding cover letter of the single fax job and b) a code, such as a barcode code or promotion code, specific to a particular sender or recipient to be placed on each corresponding cover letter of the single fax job.

Figure 9:
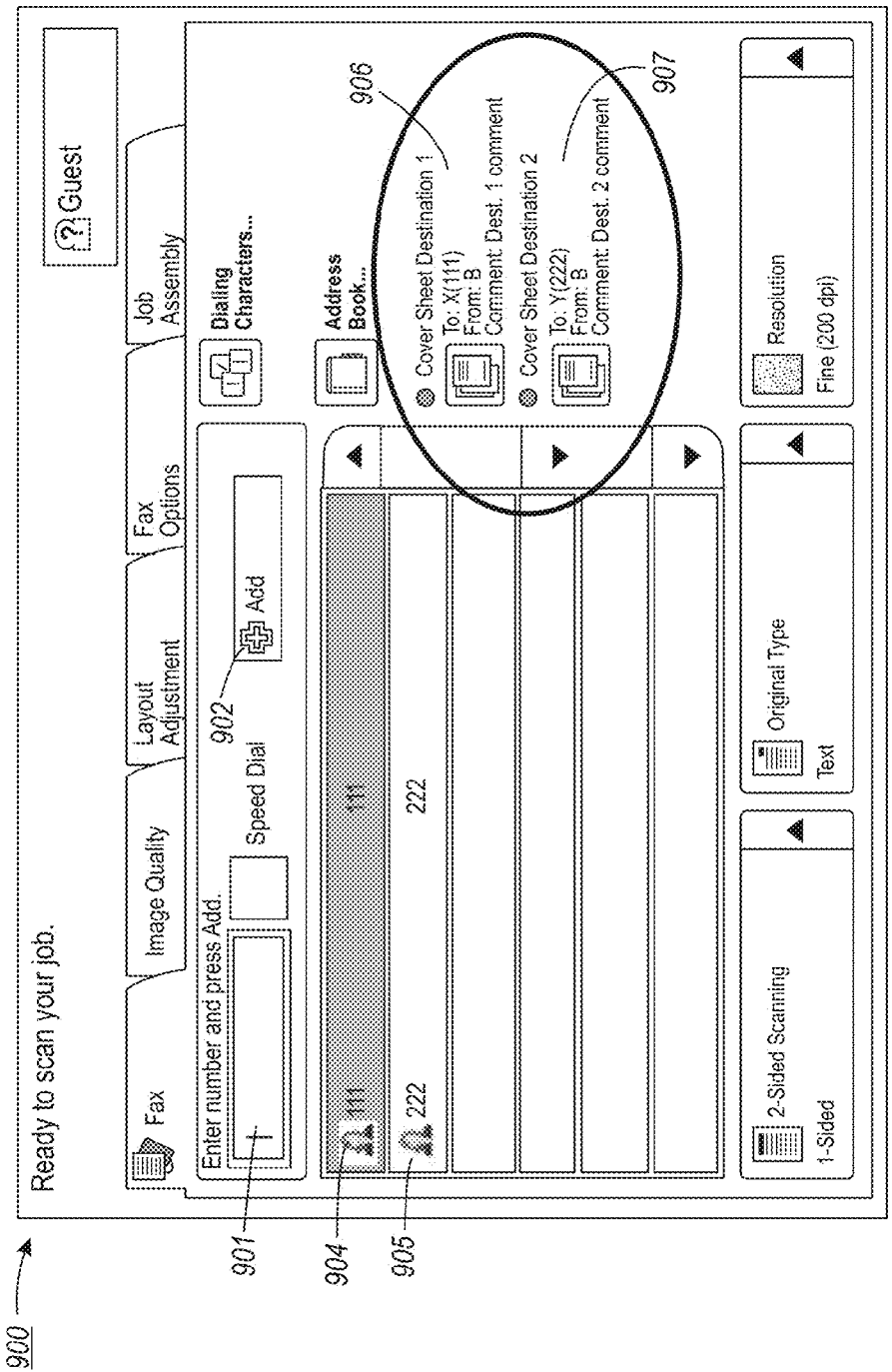
FIG. 9 depicts a fourth exemplary user interface screen for enabling the customization of a single cover letter for a fax transmission to multiple recipients and/or destinations.

Referring to FIG. 9, after designating multiple cover letters for a single fax job and identifying the recipients and comments associated therewith, the system generates an interface 900 which provides an input areas 901, such as a dialog box, into which a user may input telephone numbers of each recipient of the single fax job using, for example, a keyboard, mouse, electronic pen, touch screen, or other input device that is integrated into, or otherwise in data communication with, the fax machine. A scroll bar or alternatively, an add icon 902, may be used to input additional telephone numbers. It should be appreciated that an add icon may be used to generate multiple input areas and, therefore, in the input areas need not be concurrently displayed, as shown in FIG. 7. Rather, they can be sequentially displayed, alternatively displayed, or concurrently displayed. In display areas 904, 905, the recipients of the fax job are listed, along with the inputted telephone number. In display areas 906, 907, the interface 900 displays a summary of the customized cover sheets, including the "To", "From", and "Comments" for each of the tailored cover sheets.

Upon actual initiation of the fax job, documents to be transmitted are scanned into the fax machine's memory, formatted into an electronic document, associated with the appropriate electronic cover sheet, and then transmitted, sequentially, to each recipient. It should be appreciated that, in one embodiment, the fax machine generates, within its local memory, a plurality of electronic cover sheets, each of which has been associated with an electronic version of the documents to be transmitted, and formatted, either separately or collectively, for facsimile transmission.

It will be appreciated that various above-disclosed embodiments, other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

We claim:

1. A non-transitory computer readable medium storing a plurality of programmatic instructions adapted to be executed by a fax machine for faxing a set of documents, wherein said plurality of programmatic instructions comprise:

Routines for generating an interface comprising a first option, wherein actuation of said first option determines that the fax machine should generate at least a first cover sheet and a second cover sheet with a fax job, wherein said first cover sheet is different from said second cover sheet, and wherein both said first cover sheet and second cover sheet are associated with the set of documents;

Routines, responsive to an actuation of said first option, for generating an interface comprising at least a first recipient input area for identifying a first recipient and a second recipient input area for identifying a second recipient;

Routines, responsive to an actuation of said first option, for generating an interface comprising at least a first comment input area for inputting a first comment associated with the first recipient and a second comment input area for inputting a second comment associated with the second recipient;

Routines for generating the first cover sheet comprising the first recipient and the first comment and for generating the second cover sheet comprising the second recipient and the second comment;

Routines for formatting said first cover sheet and fax job comprising the set of documents for facsimile transmission and formatting said second cover sheet and fax job comprising the set of documents for facsimile transmission; and Routines for transmitting the first cover sheet and fax job to the first recipient via facsimile transmission and for transmitting the second cover sheet and fax job to the second recipient via facsimile transmission.

2. The non-transitory computer readable medium of claim 1 wherein the first option is one of a first set of options which may be alternatively, and not simultaneously, actuated.

3. The non-transitory computer readable medium of claim 2 wherein the first set of options comprises a second option, wherein actuation of said second option determines that the fax machine should generate, and transmit, a maximum of one cover sheet with the fax job.

4. The non-transitory computer readable medium of claim 3 wherein the first set of options comprises a third option, wherein actuation of said third option determines that the fax machine should not generate any cover sheet with the fax job.

5. The non-transitory computer readable medium of claim 1 further comprising routines for generating a default comment which is automatically inputted into the first comment input area and the second comment input area upon actuating a predefined option.

6. The non-transitory computer readable medium of claim 1 further comprising routines for displaying the first cover sheet and second cover sheet prior to transmitting the first cover sheet and fax job to the first recipient and transmitting the second cover sheet and fax job to the second recipient.

7. The non-transitory computer readable medium of claim 1 further comprising routines for importing the identity of the first recipient, identity of the second recipient, first comment, and second comment from a separately executable application and for automatically populating the first recipient input area, the second recipient input area, the first comment input area, and the second comment input with said identity of the first recipient, identity of the second recipient, first comment, and second comment.

8. The non-transitory computer readable medium of claim 1 further comprising routines for generating an auditory or visual warning that the first recipient and the second recipient are associated with the same comment.

9. The non-transitory computer readable medium of claim 1 further comprising routines, responsive to an actuation of said first option, for generating an interface comprising at least a first graphical icon input area for inputting a graphical icon associated with the first recipient and a second graphical icon input area for inputting a second graphical icon associated with the second recipient.

10. The non-transitory computer readable medium of claim 1 further comprising routines, responsive to an actuation of said first option, for generating an interface comprising at least a first code input area for inputting a code associated with a first sender and a second code input area for inputting a second code associated with a second sender.

11. A method of generating and transmitting a plurality of customized cover sheets for a single fax job, comprising:

Generating an interface comprising a first option, wherein actuation of said first option determines that the fax machine should generate at least a first cover sheet and a second cover sheet with a fax job, wherein said first cover sheet is different from said second cover sheet, and wherein both said first cover sheet and second cover sheet are associated with the set of documents;

Responsive to an actuation of said first option, generating an interface comprising at least a first recipient input area for identifying a first recipient and a second recipient input area for identifying a second recipient;

Responsive to an actuation of said first option, generating an interface comprising at least a first comment input area for inputting a first comment associated with the first recipient and a second comment input area for inputting a second comment associated with the second recipient;

Generating the first cover sheet comprising the first recipient and the first comment;

Generating the second cover sheet comprising the second recipient and the second comment;

Formatting said first cover sheet for facsimile transmission;

Formatting said second cover sheet for facsimile transmission;

Transmitting the first cover sheet and fax job, comprising the set of documents, to the first recipient via facsimile transmission; and Transmitting the second cover sheet and fax job, comprising the set of documents, to the second recipient via facsimile transmission.

12. The method of claim 11 wherein the first option is one of a first set of options which may be alternatively, and not simultaneously, actuated.

13. The method of claim 12 wherein the first set of options comprises a second option, wherein actuation of said second option determines that the fax machine should generate, and transmit, a maximum of one cover sheet with the fax job.

14. The method of claim 13 wherein the first set of options comprises a third option, wherein actuation of said third option determines that the fax machine should not generate any cover sheet with the fax job.

15. The method of claim 11 further comprising generating a default comment which is automatically inputted into the first comment input area and the second comment input area upon actuating a predefined option.

16. The method of claim 11 further comprising displaying the first cover sheet and second cover sheet prior to transmitting the first cover sheet and fax job to the first recipient and transmitting the second cover sheet and fax job to the second recipient.

17. The method of claim 11 further comprising importing the identity of the first recipient, identity of the second recipient, first comment, and second comment from a separately executable application and for automatically populating the first recipient input area, the second recipient input area, the first comment input area, and the second comment input with said identity of the first recipient, identity of the second recipient, first comment, and second comment.

18. The method of claim 11 further comprising generating an auditory or visual warning that the first recipient and the second recipient are associated with the same comment.

19. The method of claim 11 further comprising generating an interface comprising at least a first graphical icon input area for inputting a graphical icon associated with the first recipient and a second graphical icon input area for inputting a second graphical icon associated with the second recipient responsive to an actuation of said first option.

20. The method of claim 11 further comprising routines generating an interface comprising at least a first code input area for inputting a code associated with a first sender and a second code input area for inputting a second code associated with a second sender responsive to an actuation of said first option.

* * * * *